United States Patent [19]

Boime et al.

[11] Patent Number: 5,015,168

[45] Date of Patent: May 14, 1991

[54] TOOL FOR MOULDING SELF-STIFFENED PANELS MADE FROM A COMPOSITE MATERIAL

[75] Inventors: Bernard Boime, Nanterre; Bernard Taquoy, Sucy en Brie, both of France

[73] Assignee: Aerospatiale Societe Nationale Industrielle, Paris Cedex, France

[21] Appl. No.: 424,066

[22] Filed: Oct. 19, 1989

[30] Foreign Application Priority Data

Nov. 8, 1988 [FR] France .................................. 88 14561

[51] Int. Cl.$^5$ ............................................ B29C 35/02
[52] U.S. Cl. .................................... 425/389; 264/552; 264/553; 264/571; 425/DIG. 60
[58] Field of Search ................ 156/285, 382; 264/257, 264/258, 286, 510-512, 522, 544, 552-554, 571; 425/110, 193, 383, 387.1, 388, 389, 403, 501, 503, 504, 508, 518, DIG. 19, DIG. 60, 182, 342.1

[56] References Cited

U.S. PATENT DOCUMENTS

| | | | |
|---|---|---|---|
| 3,666,600 | 5/1972 | Yoshino | 425/84 |
| 3,703,422 | 11/1972 | Yoshino | 156/285 |
| 3,861,977 | 1/1975 | Wiley | 264/510 |
| 3,972,766 | 8/1976 | Fontvieille | 156/382 |
| 4,267,147 | 5/1981 | Pogoda et al. | 264/571 |
| 4,608,220 | 8/1986 | Caldwell et al. | 264/510 |
| 4,882,118 | 11/1989 | Megarry | 264/571 |
| 4,915,896 | 4/1990 | Rachal | 264/511 |

FOREIGN PATENT DOCUMENTS

| | | |
|---|---|---|
| 3418110 | 11/1985 | Fed. Rep. of Germany . |
| 3643502 | 7/1988 | Fed. Rep. of Germany . |
| 2440831 | 6/1980 | France . |

OTHER PUBLICATIONS

Modern Plastics International, vol. 17, No. 4, Apr. 1987, pp. 44-47, Lausanne, CH: A. S. Wood: "Advanced Thermoplastic Composites Get The Full Automation Treatment".

Composite, vol. 23, No. 3, May-Jun. 1983, pp. 5-9, Paris, FR; G. Keil et al.: "Thermosetting Preimpregnated Materials and the Equipment Necessary for Obtaining Them".

Composites, vol. 19, No. 1, Jan. 1988, pp. 37-47, Butterworth & Co., Ltd., Guildford, Surrey, GB, P. J. Mallon et al.: "Development of a Pilot Autoclave for Polymeric Diaphragm Forming of Continuous Fibre-Reinforced Thermoplastics".

Primary Examiner—Jay H. Woo
Assistant Examiner—James P. Mackey
Attorney, Agent, or Firm—Pearne, Gordon, McCoy & Granger

[57] ABSTRACT

For moulding self-stiffened panels (A) from a composite material with a thermosetting matrix, use is made of a tool having a block (10), a sealing bag (12), whose peripheral edge is connected to the block by a sealing bead (14), and solid, non-deformable calibration parts (22). Panel (A) is placed in a tight volume (16) defined between the block and the bag, while the parts (22) are placed outside said volume, above the bag and between the panel stiffeners (C). The calibration parts (22) are connected by a rigid structure (24). Thus, when the volume (16) is placed under a vacuum and when the tool is placed in an oven or autoclave, a uniform pressure is applied to the panel by the bag (12) and the parts (22) ensuring the maintenance of the geometry of the stiffeners.

6 Claims, 2 Drawing Sheets

TOOL FOR MOULDING SELF-STIFFENED PANELS MADE FROM A COMPOSITE MATERIAL

BACKGROUND OF THE INVENTION

The invention relates to a tool making it possible to manufacture by moulding self-stiffened panels made from a composite material with a thermosetting matrix.

Composite material parts are generally produced by stretch forming several superimposed layers, each constituted by impregnated resin fibres. According to the envisaged application, the fibres can be of carbon, glass, Kevlar, etc. The resin constituting the composite material matrix is generally a thermosetting resin, which is thermally polymerized.

The invention is applicable to all industrial fields using composite material parts, i.e. particularly the aeronautical, space, car, maritime and railway industries.

In these different fields, the use of composite material parts makes it possible to make structures considerably lighter. This weight gain is due not only to the specific strength of these materials, which exceeds that of standard metal alloys, but also the possibility offered by these materials with regards to obtaining complex shapes by moulding. Therefore it is possible to assemble as a single composite material part a mechanical subassembly which, conventionally, would be constituted by several basic metal parts interconnected e.g. by welding or mechanical fixtures (rivets, screws, etc.).

In the particular case of self-stiffened panels formed from a base plate provided with stiffeners, it is possible to produce these panels as a single composite material part, whereas according to the prior art the panels are made from a base plate to which are connected, e.g. by riveting, angle iron-shaped stiffeners.

The manufacture of such self-stiffened panels made from composite material with a thermosetting matrix takes place by moulding using an appropriate tool, which is placed in an oven or an autoclave, whereof the temperature rise ensures the polymerization of the resin.

In practice, this moulding operation causes production problems linked on the one hand with the functions to be satisfied during the moulding of a thermosetting composite material and on the other with the special structure of self-stiffened panels.

The functions to be satisfied during the moulding of a thermosetting composite material part are:
- the temperature rise necessary for activating the polymerization reaction;
- the application of a pressure perpendicular to the surface of the layers throughout the duration of the baking cycle of the part necessary for the good compacting of the layers and the final quality of the part;
- the application of a uniform pressure to the entire surface of the part, so as to avoid the local expulsion of the resin by a differential pressure effect between two zones, resulting from the low viscosity of said resin at the start of the polymerization cycle; and
- the use of a moulding tool, whose pressure application system is able to follow the thickness decreae of the parts in all directions occurring during polymerization, in order that said system can fulfil its function throughout the polymerization cycle.

Moreover, the manufacture of a self-stiffened panel requires the use of a moulding tool which is also able to fulfil the geometrical function of maintaining the spacing between the stiffeners and maintaining the planeity of said stiffeners, so as to prevent any undulation thereof, which might lead to a local buckling of the compressively stressed panels.

The presently used moulding tools for moulding such structures suffer from major disadvantages. A first known tool is constituted by a closed or sealed mould, in which are fixed inflatable bags positioned between the stiffeners of the panel to be polymerized. In this case, the mould containing the part and the bags must be solid, so as to take up the internal compressive stresses applied thereto. It is therefore expensive and difficult to heat.

Moreover, as inflatable bags are by their very nature flexible, floating elements, the maintaining of the spacing between the stiffeners and the maintenance of the planeity thereof are not ensured in a satisfactory manner. In other words, the parts obtained suffer from serious geometrical defects.

Finally, such a tool becomes very voluminous when used for moulding parts several meters long.

Another known tool for moulding self-stiffened panels has, like the previous one, a solid sealed mould. However, the inflatable bags are replaced by elastomer shims. This tool has the same disadvantages as the previous tool with regards to the dimensioning of the mould.

In addition, the pressure applied to the part results from the thermal expansion of elastomer cores, so that the pressure and temperature cannot be separately controlled. This is prejudicial when using certain resins for forming the composite material matrix.

Moreover, although the geometrical maintenance of the stiffeners is better than when using inflatable bags, the creation of local overstresses can lead to flow or creep of the material constituting the expandable cores, so that the latter then move with them the adjacent stiffeners. The maintenance of the spacing between the stiffeners, as well as their planeity are consequently not totally assured.

In addition, the solid elastomer cores do not make it possible to uniformly redistribute the stresses in all directions, so that the pressure applied to the part being moulded is not uniform. Finally, the thickness reduction of the part during polymerization is accompanied by a drop in the pressure applied by the elastomer cores, which has an effect on the final quality of the part.

In another known tool, elastomer shims are also placed between the stiffeners of the panel to be polymerized, but the thus formed assembly is placed between a block on which the base plate of the panel rests and a bag, whose peripheral edge is connected in sealed manner to the block, said bag covering the elastomer shims. The pressure is applied to the part by forming a vacuum in the space defined between the block and the bag and containing both the part and the shims. In this case, the elastomer shims are used as geometrical shapers and redistribute on the panel the internal pressure of the autoclave, which is applied to the sealing bag.

In this procedure, pressurizing is separate from the temperature and the same flexibility for the control of the baking cycles is obtained as when using inflatable bags. Furthermore, the tool does not have to take up high compressive stresses, because on both faces it is exposed to the pressure prevailing in the autoclave. Therefore the block can be formed in a very light wall.

However, as in the preceding arrangement, the pressure applied to the part is not perfectly uniform and the maintaining of the spacing between the stiffeners and the planeity of the latter are dependent on possible creep of the material constituting the shims.

In a fourth known method for producing self-stiffened composite material panels, use is made of a tool comparable to that of the third method described hereinbefore, i.e. a block associated with a sealing bag, whilst replacing the elastomer material shims by solid, non-deformable shims. The bag then applies the pressure prevailing in the autoclave, through the non-deformable shims, to the base plate parts located between the stiffeners. Moreover, the differential expansion between the shims and the block applies a pressure to the faces of the stiffeners. Thus, this method makes it possible to guarantee good positioning and planeity characteristics of the stiffeners.

However, the pressure applied to the stiffeners is dependent on the temperature and is consequently not identical to that applied to the base plate. Consequently there is a differential pressure between the base plate and the stiffeners, which tends to expel the resin towards the base plate at the end of the polymerization cycle.

Moreover, this solution is disadvantageous when the base plate has local overthicknesses. Thus, thickness variations of the plate during the polymerization cycle differ as a function of whether the base plate zones are thicker or thinner, so that the non-deformable shims would only bear at the end of the cycle on the thinner zones of the base plate. Consequently no pressure would then be applied to the thicker zones of the latter.

Thus, at present, there is no moulding method which is completely satisfactory for making it possible to produce self-stiffened panels made from a composite material with a thermosetting matrix.

SUMMARY OF THE INVENTION

The present invention relates to a novel tool making it possible to mould self-stiffened panels of composite material, whilst guaranteeing a perfect geometry of the stiffeners, as well as the obtaining of temperature and pressure conditions which it is desirable to respect during the moulding of a composite material with a thermosetting matrix.

According to the invention, this result is obtained by means of a tool for the moulding of self-stiffened panels of composite material with a thermosetting matrix, formed from a base plate provided with stiffeners, incorporating a block, a sealing bag, whereof one peripheral edge is tightly connected to the block, a tight volume being defined between the block and the bag, as well as solid calibration parts which can be placed between the stiffeners of a panel to be moulded placed in said tight volume, characterized in that the solid calibration parts are located outside said tight volume.

As a result of this arrangement, the pressure is applied directly by the sealing bag both to the base plate and to the stiffeners. Therefore the pressure is distributed in a perfectly uniform manner and follows the thickness variations of the part resulting from the polymerization of the resin. The tool is also perfectly adapted to the manufacture of panels, whose base plate has a variable thickness, e.g. due to the presence of local reinforcements. Moreover, the positioning and straightness of the stiffeners are ensured by the solid calibration parts positioned above the bag.

Finally, like the other known tools using a sealing bag tightly connected to a block, the tool does not have to take up the pressure, so that it can be formed by relatively thin parts and the panel is easy to heat, no matter what its dimensions.

Preferably, the solid calibration parts are interconnected by a rigid connecting structure, which has a thermal expansion coefficient approximately equal to that of the panel to be produced. In this case, a detachable bracket can be joined to the connecting structure in order to position the latter on the block.

Advantageously, in order to ensure a satisfactory surface state of the panel after baking, elastomeric material covers are interposed between the sealing bag and the panel to be moulded, so as to protect the latter from the creases or folds of the bag.

Elastomeric material shims can also be placed within the tight volume, in the extension of each stiffener. These shims make it possible to protect the ends of the stiffeners and prevent pinching or sliding of the fibres of the composite material at this location.

In order that the calibration parts can easily be fitted whilst still fulfilling their function with regards to the position and planeity of the stiffeners, between each of these parts and each of the stiffeners there is a clearance between a minimum clearance and a maximum clearance of predetermined nature at the polymerization temperature of the panel, the calibration parts having an expansion coefficient such that, at ambient temperature, said clearance is at least equal to 0 and preferably at the most equal to said maximum clearance. The minimum and maximum clearances can be respectively approximately 0.1 and 0.2 mm.

The invention is described in greater detail hereinafter relative to a non-limitative embodiment and the attached drawings.

DETAILED DESCRIPTION OF THE PREFERRED EMBODIMENT

Figure 1:
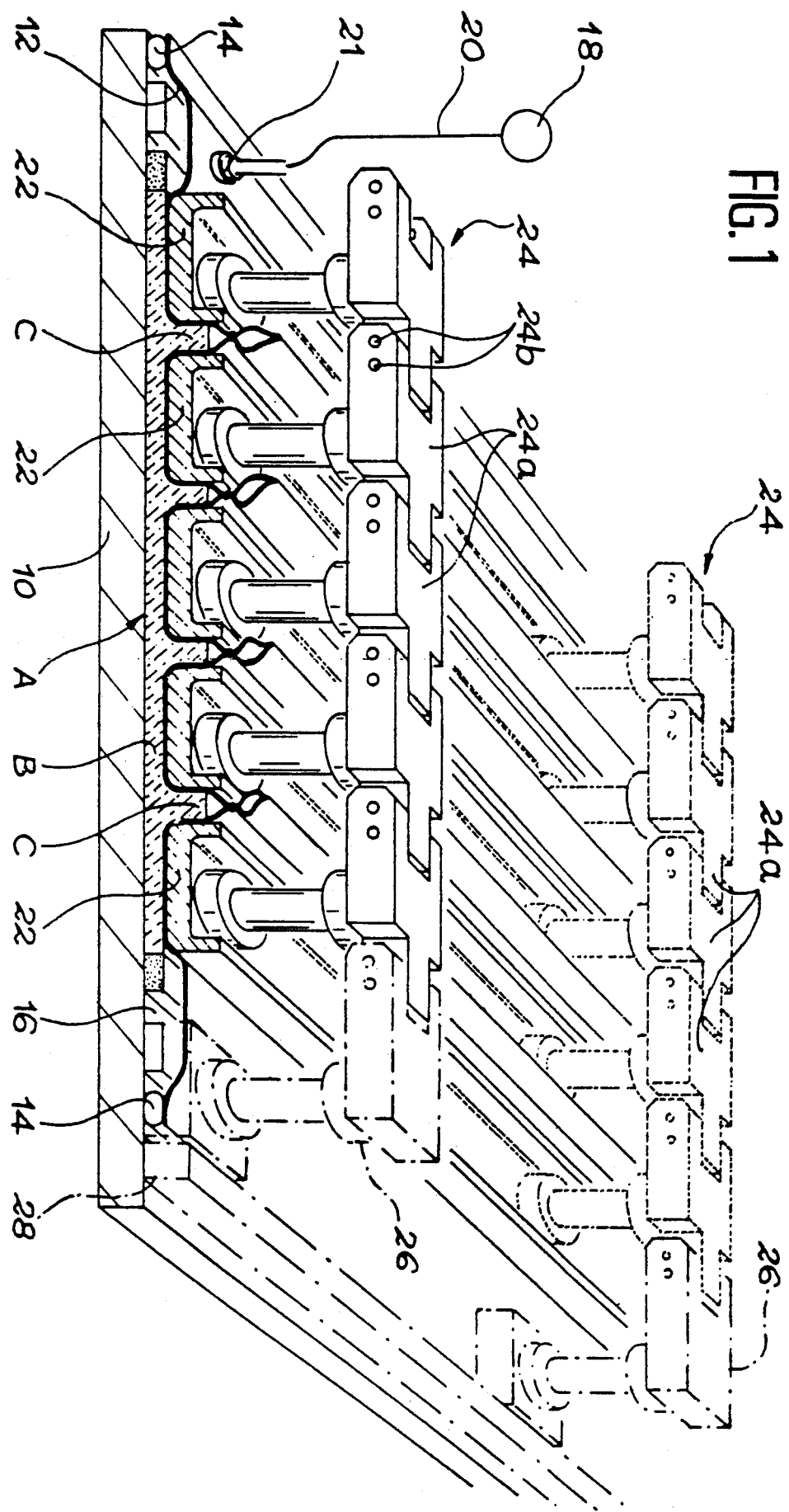
FIG. 1 is a perspective, part sectional view diagrammatically showing a tool according to the invention used for moulding a self-stiffened panel of composite material.

FIG. 1 shows the tool used according to the invention for carrying out the moulding under pressure of a self-stiffened panel A of a composite material, whose matrix is formed from a thermosetting resin. Panel A comprises a base plate B, which can be planar or slightly curved and whose thickness can be constant or variable, as well as stiffeners C all projecting over the same face of base plate B, perpendicular thereto, said stiffeners being parallel to one another and generally having a constant spacing.

The tool of FIG. 1, in which has been previously formed the panel A in a manner to be described hereinafter, is intended to be placed in an oven or autoclave making it possible to subject said panel to a predetermined temperature cycle ensuring the polymerization of the resin forming the panel matrix.

The tool according to the invention firstly comprises a block 10 in the form of an e.g. metallic plate of limited thickness and which is intended to be positioned horizontally. The upper face of said plate has a shape complimentary to that of the outer surface of panel A to be moulded. For simplification purposes said upper face is shown in planar form in FIG. 1, but it is readily apparent that it can also be curved, as a function of the shape of the panel to be produced.

The tool of FIG. 1 also comprises a sealing bag 12, which is positioned according to the invention immediately above the panel A to be moulded, so as to follow the contours of the latter. The dimensions of the bag exceed those of the panel, so that the peripheral edges of bag 12 can be tightly connected to block 10 all around the panel, e.g. by a sealing mastic bead 14 or by any other means fulfilling the same function.

The assembly formed by block 10 and by the sealing bag 12 defines a tight volume or pocket 16 in which is placed the panel A to be moulded. This tight volume 16 communicates with a vacuum pump 18 by a duct 20, e.g. connected to the sealing bag 12 by a cap or ferrule provided on the latter.

Under the effect of the pressure difference existing between the interior of the oven or autoclave in which the tool is placed and the tight volume 16, when the vacuum pump 18 is actuated, a pressure independent of the temperature prevailing in the oven or autoclave is uniformly applied by the bag 12 to the base plate B on the edges of the stiffeners C and even to the rounded connection zones formed at the base of said stiffeners. The pressure applied in this way to the panel A is independent of the thickness reduction of said panel occurring during the polymerization of the resin, as well as thickness variations of the base plate B, e.g. resulting from the presence of local reinforcements therein.

In order to ensure the maintenance of the geometry of stiffeners C during moulding, i.e. the maintenance of the spacing of said stiffeners, as well as the maintenance of their planeity, the tool according to the invention also comprises solid calibration parts 22 which, according to the invention, are placed above the sealing bag 12, i.e. outside the tight volume 16, between the stiffeners C of the panel A to be moulded. As shown by FIG. 1, these calibration parts have an approximately U-shaped cross-section and extend between the stiffeners of panel A over the entire length of the latter.

It should also be noted that the calibration parts 22 are made from a solid material, i.e. a rigid material which does not creep and whose shape remains constant throughout the panel polymerization cycle, except for thermal expansions. This material can in particular be a metal or metal alloy.

As shown in FIG. 1, the positioning of the calibration parts 22 with respect to one another and the maintenance of their spacing are assured by a connecting structure formed by at least two spaced assemblies 24 distributed over the entire length of the panel to be moulded.

Each of the assemblies 24 is constituted by several independent elements 24a, each of which has a column, whereof one end is intended to be fixed to one of the calibration parts 22. The rigidity of each element 24 is assured by groups of two pins simultaneously traversing each pair of adjacent elements 24a.

In order to ensure that the feet of the stiffeners C do not move during the polymerization cycle, the connecting structure formed by assemblies 24 have a thermal expansion coefficient approximately equal to that of the panel A to be produced.

Advantageously and as is also shown in FIG. 1, the tool according to the invention also has detachable brackets 26 making it possible to ensure the positioning of each assembly 24 of the connecting structure carrying the calibration parts 22 relative to the block 10 prior to polymerization. Each bracket 26 is joined to one of the elements 24a of the connecting structure 24 by two pins 24b and it rests on the upper face of block 10, so that it can e.g. be brought against a detachable abutment 28 projecting over the latter.

Each of the brackets 26 is retracted when the tool is placed in the oven or autoclave, so that the assembly floats, except in the special case where the block 10 is made from a material identical to that of the connecting structure.

The dimensions of the calibration parts 22 are chosen so as to respect the polymerization temperature, whereby the calibration parts must not lock the stiffeners, so that only the sealing bag bears on said stiffeners, which is necessary for applying a uniform pressure to the entire panel and the polymerization temperature of the panel, whereby it is also desirable that the calibration parts are sufficiently close to the stiffeners to avoid any local deformation of the latter.

In practice, for respecting these two conditions, the calibration parts are dimensioned in such a way that at the polymerization temperature, the clearance between each of these parts and each of the adjacent stiffeners is min. 0.1 mm and max. 0.2 mm.

Moreover, the calibration parts 22 must not squeeze or press on the edges of the stiffeners C at ambient temperature, so that said parts can be mounted on elements 24a. Thus, the expansion coefficient of the material from which the calibration parts 22 are made must be chosen in such a way that at ambient temperature, the clearance between each calibration part and each adjacent stiffener is at least equal to 0 and preferably at the most equal to the maximum clearance of 0.2 mm.

The material from which the calibration parts 22 is made is chosen as a function of these objectives, the expansion coefficient of the parts being lower the greater the spacing and the thicker the stiffeners. Moreover, the thicker the stiffeners, the greater the swelling between the fresh composite material and the baked composite material.

Figure 2:
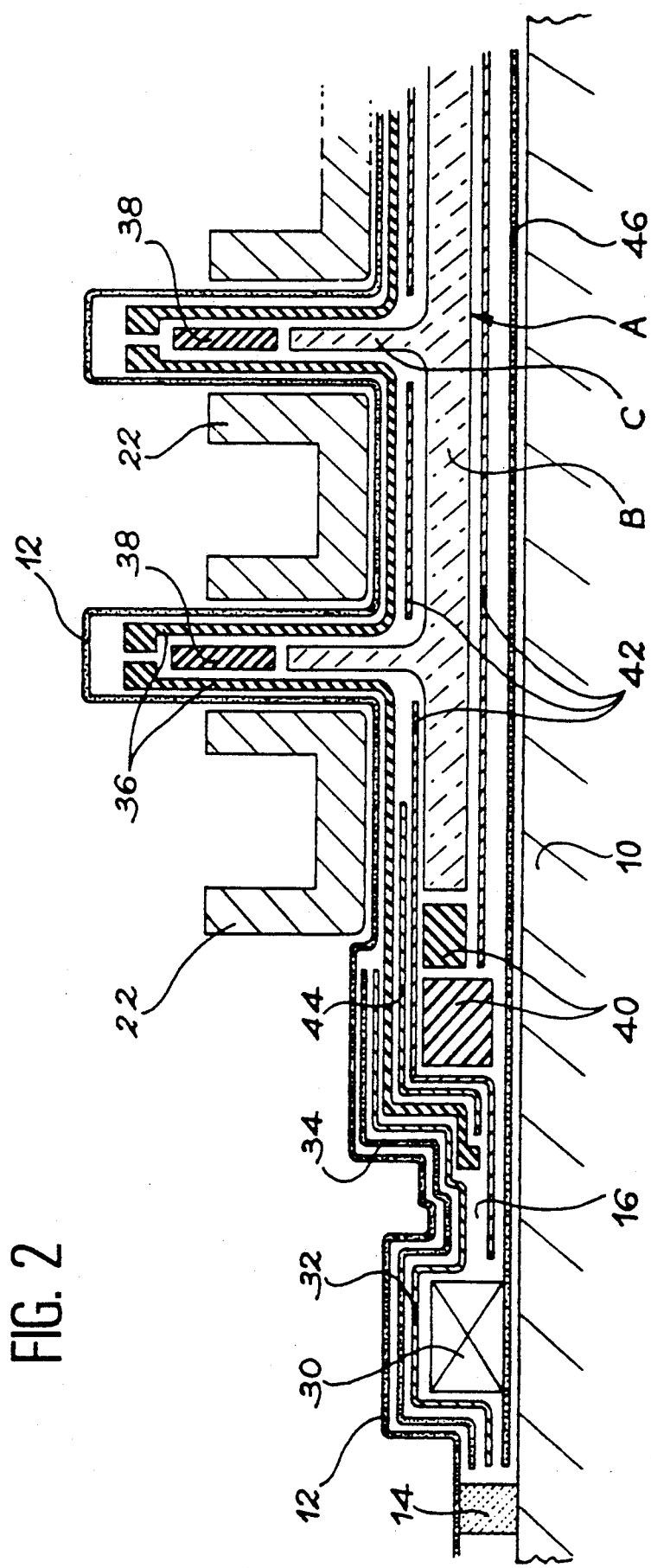
FIG. 2 is a sectional view showing on a larger scale and in greater detail part of the tool of FIG. 1.

As is more particularly illustrated in FIG. 2, in its part located immediately within the sealing mastic bead 14, the sealing bag 12 overlaps a profile 30 resting on the upper face of the block 10, whilst surrounding panel A. According to conventional procedures, a separating film 34 and a draining fabric 32 are placed in this order on the inner face of the sealing bag 12, in the part of the latter projecting beyond the peripheral edge of panel A.

Preferably, elastomeric material covers 36 are placed between the sealing bag 12 and the panel A, so as to completely cover the latter. These covers are placed edge to edge, so that their adjacent edges are located in the extension of the ends of the stiffeners C. The particular function of the covers 36 is to prevent any creases or folds formed in the bag from damaging the surface state of the panel. The elastomeric material constituting these covers must be able to deform so as to integrally transmit to the panel the pressure applied by the bag.

Elastomeric material shims 38 are placed within the tight volume 16 in the extension of each of the stiffeners C. The thickness of shims 38 is approximately equal to the thickness of the stiffeners, which avoids pinching or sliding of the fibres at the end of the latter.

A two-part, elastomeric material frame 40 surrounds the base plate B of panel A, the thickness of said frame being approximately equal to that of plate B.

As illustrated in FIG. 2, the elastomer covers 36 cover both panel A, shims 38 and frame 40.

According to a conventional procedure, the upper and lower faces of base plate B of the panel are covered by a glass fabric 42, called delamination fabric, whose function is to ensure the draining of the gases released during polymerization and protects the panel after removal from the mould. A separating film 44 is also placed between the elastomer cover 36 and the delamination fabric 42 in the peripheral zone of the panel and covering the frame 40. Finally, a mould removal film 46 coated with polytetraflouroethylene, such as TEFLON, is placed directly on the block 10 and covers the entire surface of the latter located within the sealing mastic bead 14.

Apart from the advantages referred to hereinbefore regarding the uniformity of the pressure applied and the maintenance of a good geometry of the stiffeners, the tool according to the invention, when placed in an oven or autoclave, makes it possible to ensure a rapid heating of the part. Moreover, its overall dimensions and weight are reduced, because the dimensions of said tool do not have to take up the compressive forces.

The use of the tool described initially takes place by a draping operation. With the mould open, said operation consists of draping onto the block 10 a certain number of layers of preimpregnated fibres of thermosetting resin, in order to form the lower part of base plate B.

Separately a certain number of layers of preimpregnated fibres of thermosetting resin is draped onto the calibration parts 22. The sealing bag 12 and the elastomer covers 36 are placed on the calibration parts prior to the start of draping. The U-shaped profiles formed in this way on each of the calibration parts are then joined to one another and connected by the rigid connecting structure 24 in such a way as to form the stiffeners C and the upper part of base plate B.

After the auxiliary parts of the tool, such as the elastomer frame 40 and the profile 30 have been placed on block 10, the assembly formed by the rigid connecting structures 24, the calibration parts 22 and the portion of the panel to be produced previously draped onto said parts is turned over and placed above the block in the position illustrated in FIG. 1. The correct positioning of the thus turned over portion of the panel with respect to the portion previously draped on the block is brought about with the aid of detachable brackets 26. The elastomer shims 36 are placed in the extension of the ends of the stiffeners. The pins 24b are removed and the calibration parts 22 are withdrawn and then repositioned individually so as to permit the putting into place of bag 12. When structure 24 is formed again by fitting pins 24b, the bracket 25 is removed and the sealing mastic bead 14 put into place.

The tool can then be placed in an oven or autoclave, where it undergoes the temperature cycle necessary for the polymerization of the resin constituting the matrix of the panel, after the tight volume 16 has been placed under a vacuum by vacuum pump 18. When polymerization is ended, the tool is removed from the oven and the panel removed from the mould.

Obviously, the invention is not limited to the embodiment described in exemplified manner hereinbefore and covers all variants. Thus, the connecting structure of the calibration parts can be produced so as to permit the adjustment of the spacing between these parts, which makes it possible to use a single structure for moulding panels with a variation in the spacing between the stiffeners.

What is claimed is:

1. A tool for moulding self-stiffened panels of composite material with a thermosetting matrix, formed from a base plate provided with stiffeners, said tool comprising a block, a sealing bag having a peripheral edge tightly connected to the block, a tight volume being defined between the block and the bag, and solid calibration parts which are placed between the stiffeners of a panel to be moulded placed in said tight volume, and wherein the solid calibration parts are placed outside said tight volume.

2. A tool according to claim 1, wherein the solid calibration parts are connected by a rigid connecting structure.

3. A tool according to claim 2, wherein the connecting structure has a thermal expansion coefficient approximately equal to that of a composite material with a thermosetting matrix.

4. A tool according to claim 2, wherein a detachable bracket can be joined to the connecting structure so as to position the connecting structure on the block.

5. A tool according to claim 1, wherein elastomeric material covers are interposed between the sealing bag and the panel to be moulded.

6. A tool according to claim 1, wherein elastomeric material shims are placed within the tight volume extending from said stiffeners.

* * * * *